United States Patent
Kaiser, Jr.

(10) Patent No.: US 10,531,652 B2
(45) Date of Patent: Jan. 14, 2020

(54) RAPTOR NEST DETERRENT

(71) Applicant: James L. Kaiser, Jr., Seattle, WA (US)

(72) Inventor: James L. Kaiser, Jr., Seattle, WA (US)

(*) Notice: Subject to any disclaimer, the term of this patent is extended or adjusted under 35 U.S.C. 154(b) by 1 day.

(21) Appl. No.: 15/694,486

(22) Filed: Sep. 1, 2017

(65) Prior Publication Data

US 2018/0055038 A1    Mar. 1, 2018

Related U.S. Application Data

(60) Provisional application No. 62/382,611, filed on Sep. 1, 2016.

(51) Int. Cl.
*A01M 29/00* (2011.01)
*A01M 29/32* (2011.01)
*E04H 12/00* (2006.01)

(52) U.S. Cl.
CPC ............. *A01M 29/32* (2013.01); *E04H 12/00* (2013.01)

(58) Field of Classification Search
CPC ..... A01M 29/32; A01M 29/06; E04D 13/004; E04D 13/00; A01K 15/02; A01K 31/12
USPC ....... 119/713, 903, 57.9, 469, 52.3, 537, 59, 119/63, 712; 52/101
See application file for complete search history.

(56) References Cited

U.S. PATENT DOCUMENTS

| | | | | |
|---|---|---|---|---|
| 4,074,653 A | * | 2/1978 | Pember | A01M 29/06 116/22 A |
| 4,962,619 A | * | 10/1990 | Chatten | A01M 29/32 119/903 |
| 5,181,338 A | * | 1/1993 | Chatten | A01M 29/06 43/1 |
| 5,400,552 A | * | 3/1995 | Negre | A01M 29/32 52/101 |
| D357,771 S | * | 4/1995 | Townsend, III | 119/903 |
| 5,433,029 A | * | 7/1995 | Donoho | A01M 29/32 256/11 |
| 5,713,160 A | * | 2/1998 | Heron | A01M 29/32 119/903 |
| D404,107 S | * | 1/1999 | Dimston | D22/120 |
| 5,974,998 A | * | 11/1999 | Gregg, III | B63B 15/0083 114/90 |
| 6,264,173 B1 | * | 7/2001 | Badger | A01K 3/005 256/10 |
| 6,514,010 B2 | * | 2/2003 | Dreyer | E02B 15/08 119/713 |

(Continued)

*Primary Examiner* — Yvonne R Abbott-Lewis
(74) *Attorney, Agent, or Firm* — Alloy Patent Law; Walker Weitzel

(57) ABSTRACT

A nesting deterrence device for elevated infrastructure is designed to be mounted within a deterrence area on elevated infrastructure, such as cell and data towers, utility poles, sports lighting, and the like, in order to deter raptors (i.e., Osprey) and other birds with relatively long wingspans, greater than 33 inches (84 centimeters), from entering into a deterrence volume immediately above the deterrence area. Birds are deterred from flying through the deterrence volume by a plurality of deterrence rods, spaced and oriented within the deterrence volume, which would interfere with bird flight. Because birds would be prevented from freely flying through the volume, they would be unable to alight and nest in the deterrence area below.

9 Claims, 6 Drawing Sheets

(56) References Cited

U.S. PATENT DOCUMENTS

| | | | | |
|---|---|---|---|---|
| 6,640,506 B2 * | 11/2003 | Landers | ............... | A01M 29/06 43/1 |
| 6,718,701 B2 * | 4/2004 | Riddell | ............... | A01M 29/32 119/537 |
| 6,775,950 B2 * | 8/2004 | Donoho | ............... | A01M 29/32 119/713 |
| 6,836,992 B2 * | 1/2005 | Rains | ................... | A01M 29/32 114/90 |
| 6,918,214 B2 * | 7/2005 | Sabine | .................. | A01K 15/02 119/469 |
| 7,036,278 B1 * | 5/2006 | Donoho | ............... | A01M 29/06 43/1 |
| 7,040,058 B2 * | 5/2006 | Finkelstein | .......... | A01M 29/32 52/101 |
| 7,243,465 B2 * | 7/2007 | Donoho | ............... | A01M 29/32 52/101 |
| 7,596,910 B1 * | 10/2009 | Donoho | ............... | A01M 29/32 52/101 |
| 7,802,405 B1 * | 9/2010 | Donoho | ............... | A01M 29/32 52/100 |
| 8,434,274 B2 * | 5/2013 | Anderson, Jr. | ...... | H01Q 1/1242 119/903 |
| 8,438,998 B2 * | 5/2013 | Spencer | ............... | A01M 29/06 119/712 |
| 8,915,026 B2 * | 12/2014 | Myers | .................. | A01M 29/30 119/712 |
| 9,149,023 B2 * | 10/2015 | Davis | .................... | A01K 31/12 |
| 9,668,468 B1 | 6/2017 | Nichols | | |
| 2012/0174498 A1 | 7/2012 | Anderson | | |

\* cited by examiner

RAPTOR NEST DETERRENT

CROSS-REFERENCE TO RELATED APPLICATIONS

This application claims priority to U.S. Provisional Application No. 62/382,611 filed Sep. 1, 2016. The content of the above application is incorporated by reference in its entirety.

FIELD OF THE DISCLOSURE

This disclosure relates generally to the field of nesting bird deterrence.

BACKGROUND

Birds frequently build nests on large man-made elevated structures such as chimneys, waterway navigation markers, outdoor sports lighting, and poles or towers used in the telecommunication and electric power industry. Raptors (*Pandion haliaetus, Aquila* spp., *Falco* spp.) corvids (*Corvus* spp.), and storks (*Ciconiidae* spp.) are birds with large wingspans that build large stick nest near the top of these tall, isolated structures which can cause human-bird conflicts and nest management issues. Large birds nesting on such structures present hazards to the birds themselves, structure integrity and equipment function, human health, and worker safety when accessing the structures for maintenance. Hazards include bird electrocution; structure equipment malfunction, failure or fire due to nest material obstruction with energized components or cooling vents; impact damage to equipment biohazard and slipping risk from human contact with bird excrement and impact injury to ascending tower climbers or pedestrians on the ground due to direct contact with birds or falling nest sticks.

The electric power industry has long experienced transmission outages, pole fires, bird electrocutions and other problems related to bird nesting on energized power poles and towers (APLIC 2006). Increasingly, communication towers and outdoor stadium lights have become more abundant on the landscape with a concomitant increase in raptors and other large birds using the tall structures for nesting, as the top of the poles and towers tend to incorporate horizontal platforms or structural members for mounting antennas or lamp fixtures that provide a wide, flat surface suitable for the birds to construct a large, stable nest.

Certain species of birds and their nests are protected from human disturbance by law. In cases where a protected species is actively occupying a nest on a man-made structure, access to the structure for equipment upgrades and maintenance is often limited until after the nesting season when the migratory breeding birds have departed the nest site for wintering grounds.

Certain species of nesting birds demonstrate extremely high attraction to a particular nest site. Due to this strong nest-site fidelity, even if a nest is removed or destroyed, the breeding bird will simply rebuild a new nest at the same location. Similarly, certain species will make persistent attempts to build a nest at a chosen site on man-made structures, even if the particular location does not provide optimal structural features for the birds to construct a nest. Due to this tenacious nest-building behavior, many nest deterrent or exclusion devices are often eventually defeated, especially if no alternate nesting structures is voluntarily provided nearby for the birds after the original nest is removed and an anti-nesting device installed. Physical barriers designed to discourage large birds from perching or roosting at night on tall structures often fail to prevent nest building (APLIC 2006).

Few anti-nesting devices are designed to discourage large birds from nesting on tall, human-made structures. There is a need for a practical working device that can be quickly and easily affixed to, adjusted, and retracted or removed from the structure for worker access to perform structure maintenance. Furthermore, the device should not injure or entrap the birds, present hazards to workers accessing the structures, or interfere with the function of equipment mounted on the structure.

For the foregoing reasons, there is a need for a practical working nest deterrent device that is strong, lightweight, and durable with minimal wind resistance and structure loading effect to discourage or exclude nest building attempts by birds with relatively long wingspans greater than 33 inches (84 centimeters) that commonly build large stick nests on tall, isolated structures (hawks, eagles, ospreys, owls, corvids, storks, etc.), which can be easily and quickly installed, retracted, and removed by single person while affording simple adjustability of the device to "fit" various types of structures without creating an entrapment hazard for birds, or interference with equipment mounted on the structure or worker access for equipment maintenance.

SUMMARY

The disclosure presented herein relates to a bird nesting deterrent device. In some embodiments, the preceding and following embodiments and descriptions are for illustrative purposes only and are not intended to limit the scope of this disclosure. Other aspects and advantages of this disclosure will become apparent from the following detailed description.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The key objectives of the nesting deterrence device for elevated infrastructure are (a) to deter birds from nesting within the deterrence area atop elevated infrastructure, (b) to provide a device that may be installed using only manpower and does not require the use of heavy equipment such as cranes or other heavy lifters, (c) to provide a device that is easily negotiable or removable and replaceable in the event that human access to the deterrence area is required, and (d) does not present an entrapment hazard to nesting birds.

A nesting deterrence device for elevated infrastructure is designed to be mounted within a deterrence area on the elevated infrastructure, such as cell and data towers, utility poles, sports lighting, and the like, in order to deter birds with relatively long wingspans (greater than 33 inches (84 cm)) that are engaged in nest-building from entering into a deterrence volume immediately above the deterrence area. Birds engaged in nest-building are deterred from flying through the deterrence volume by a plurality of deterrence rods, spaced and oriented within the deterrence volume, which would interfere with bird flight and nesting material placement. Because birds would be prevented from freely flying or ferrying nesting material through the volume, they would be strongly deterred from nest building in the deterrence area below.

The nesting deterrence device is effective in deterring birds with relatively long wingspans greater than 33 inches (84 cm), such as raptors, eagles, falcons, and corvids (especially raven species) that are most frequently reported to build large stick nests on isolated, elevated infrastructure. Some embodiments are directed particularly at preventing nesting by one or more species.

In an embodiment, the deterrence rods are arranged in a radial spoke pattern in a relatively high density above the deterrence area. The close spacing of the rods prevents birds with wingspans greater than 33 inches (84 cm) engaged in nest building from reaching the deterrence area unobstructed. In this embodiment, the rods are oriented such that they are angled relative to gravity, and thus also do not provide perching opportunity for birds while also tending to shed any incidental nesting material that is placed or dropped within the deterrence volume.

In an embodiment, the deterrence rods are arranged in a multi-planar, multi-directional yagi antenna type configuration, in which rods extend from the central support in varying directions and heights above the deterrence area. In some embodiments, the rods extend away from the central support orthogonally, whereas in other embodiments, the rods are attached at oblique or acute angles. In other embodiments, combinations of both the radial spoke and modified yagi antenna configurations are employed.

In an embodiment, the central support is fastened directly to a feature within the deterrence area. In other embodiments, an intermediary bracket is fastened or attached to objects within the deterrence area, and the central support is then mounted to the intermediary bracket. Because the physical configuration of elevated infrastructure and the related deterrence areas vary widely from application to application, a wide variety of intermediary mounts may be employed.

In many installation environments, optimal deterrence area and deterrence volume dimensions are not precisely known prior to installation. In some embodiments, the device may be readily configured or customized during installation by installer adjustment of orientation and position of the intermediary mounting bracket and/or deterrence rods on the central support, as well as installer adjustability of the length of the deterrence rod length via simple rod trimming. Device customization and configurability aids in ensuring quick and optimal device orientation to obtain maximum coverage of the deterrence area and volume.

A variety of materials may be used to construct the deterrence device. In all embodiments, including the preferred embodiment, strong and rigid lightweight materials enable one-man installation without the need for heavy high lift machinery for installation. In the preferred embodiment, the central support is fiberglass rod and the deterrence rods are fiberglass. In other embodiments, the central support and deterrence rods may be any other material with structural integrity sufficient to withstand the forces encountered during and after installation, including but not limited to composite, metal, plastic, wood, or any combination thereof.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DEFINITIONS

Deterrence area: The area upon which nesting is to be deterred.

Deterrence volume: The volume of space above the deterrence area through which a bird engaged in nest building would likely need to pass.

Rod: Rigid or semi-rigid rod or tube with aspect ratio exceeding 3:1 length:width.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Figure 1:
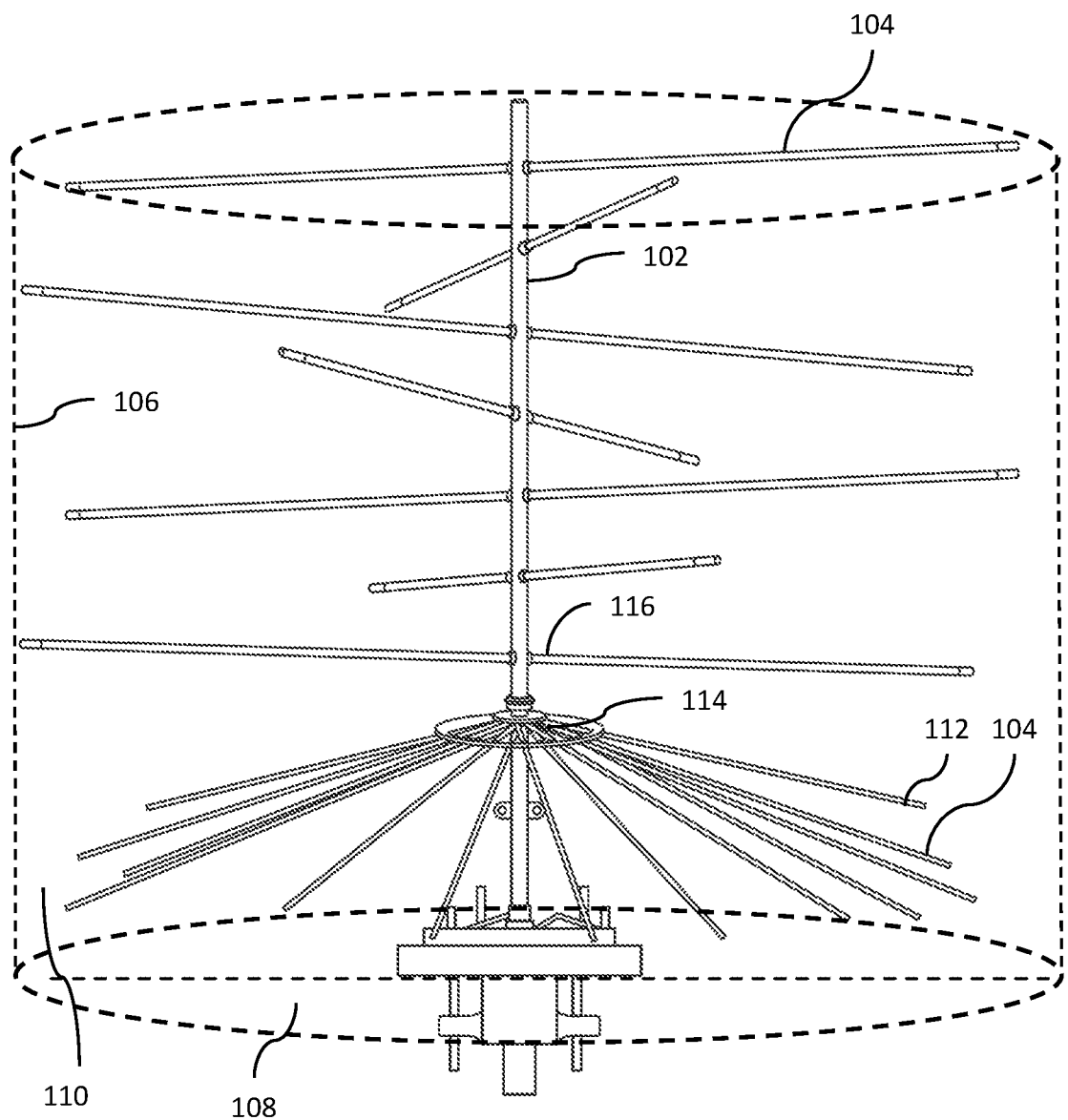
FIG. 1 is view of a preferred embodiment of the device

FIG. 1 shows a preferred embodiment of a nesting deterrence device for elevated infrastructure. The embodiment includes a central support 102 that supports a plurality of deterrence rods 104 that project through the deterrence volume 110. The plurality of deterrence rods 104 are spaced and oriented within the deterrence volume in a manner adapted to deter bird alighting and perching within the deterrence area 108 by physically interfering with all possible landing paths. Alighting deterrence is achieved by spacing and orienting the deterrence rods such that there is effectively no path through which a bird can fly without at least one rod impeding the landing path. The spacing or density of deterrence rods 104 within the deterrence volume 110 may be optimized, as a bird in the last stages of alighting is capable of negotiating a higher density of obstacles, while birds earlier in the landing process, and hence, further above the deterrence area, are less able to avoid obstacles, which allows for a lower rod density toward the upper extents of the deterrence volume. The preferred embodiment therefore has a greater density of deterrence rods in the volume nearer to the deterrence area 108.

Different species of birds present hazards for various types and locations of elevated infrastructure. As such, the orientation and arrangement of the deterrence rods may be adapted to deter different bird species of differing sizes, such that implementations that require deterrence of smaller species will require embodiments of the invention with tighter deterrence rod 104 spacing within the deterrence volume 110.

The deterrence rods 104 project through the deterrence volume 110. Said rods will be of sufficient length to extend to the peripheral surfaces 106 of the deterrence volume. In some embodiments, the deterrence rods will have a distal end 112 and a proximal end 114, and rods will be attached to the central support 102 at the proximal end 114. In other embodiments, rods may be attached to the central support 102 at the central portion 116 of the rod such that both ends of a given rod may extend toward the peripheral surfaces 106 of the deterrence volume. In some embodiments, deterrence rods extend away from central support orthogonally, while in other embodiments, the rods may extend from the central support at acute angles. In other embodiments, some rods may extend orthogonally and others may extend acutely.

Figure 2:
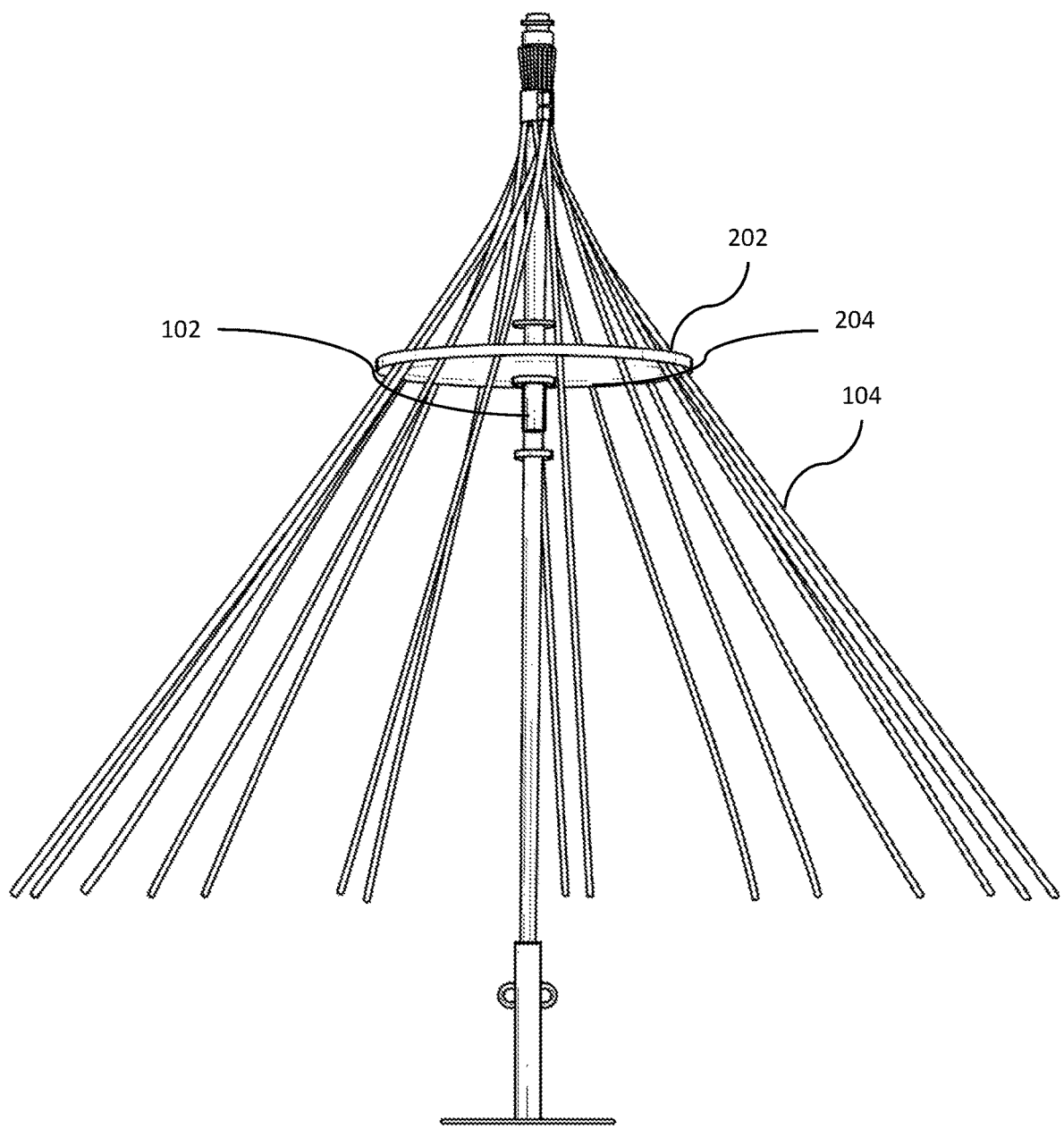
FIG. 2 is a view of an alternative embodiment

FIG. 2 shows a side view of an embodiment. Deterrence rods may be positioned and adjusted within the deterrence volume by means of one or more deterrence rod positioners 202. In an embodiment, the deterrence rod positioner 202 is a disc that captures individual rods 104 in a plurality of holes 204 arranged toward the periphery of the rod positioner disc 202. The positioner 202 is slidably coupled to the central support 102, and slidably coupled to the deterrence rods 104 via the holes 204. Repositioning said deterrence rod positioner 202 along the central support 102 will adjust the deterrence rod orientation and position.

Figure 3:
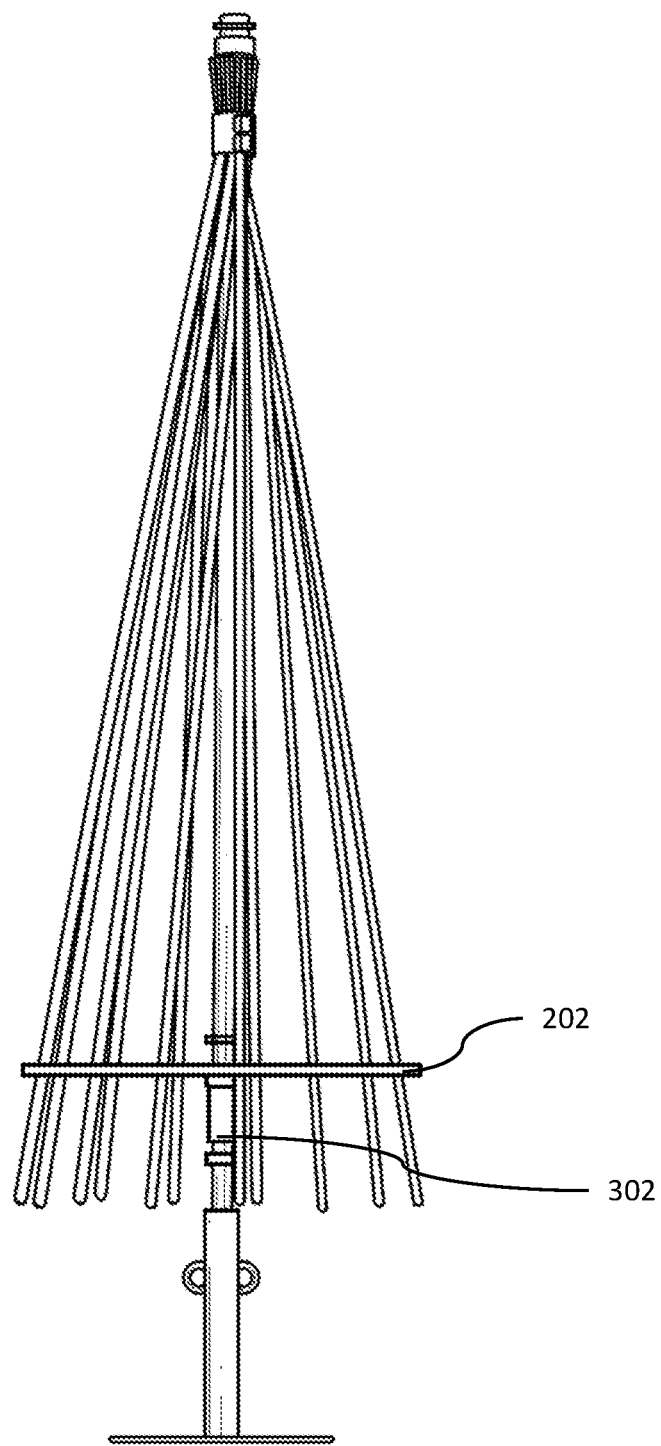
FIG. 3 is a side view of an alternative embodiment in the "rod retracted" configuration FIG. 4. is view of an alternative embodiment

FIG. 3 shows an embodiment of the device in a collapsed configuration. In this embodiment, the positioner 202 may be fixed at an extended position for deterrence operation, and the positioner 202 may be repositioned in a collapsed position 302 to facilitate device handling or entry into the deterrence volume when desired.

Figure 4:
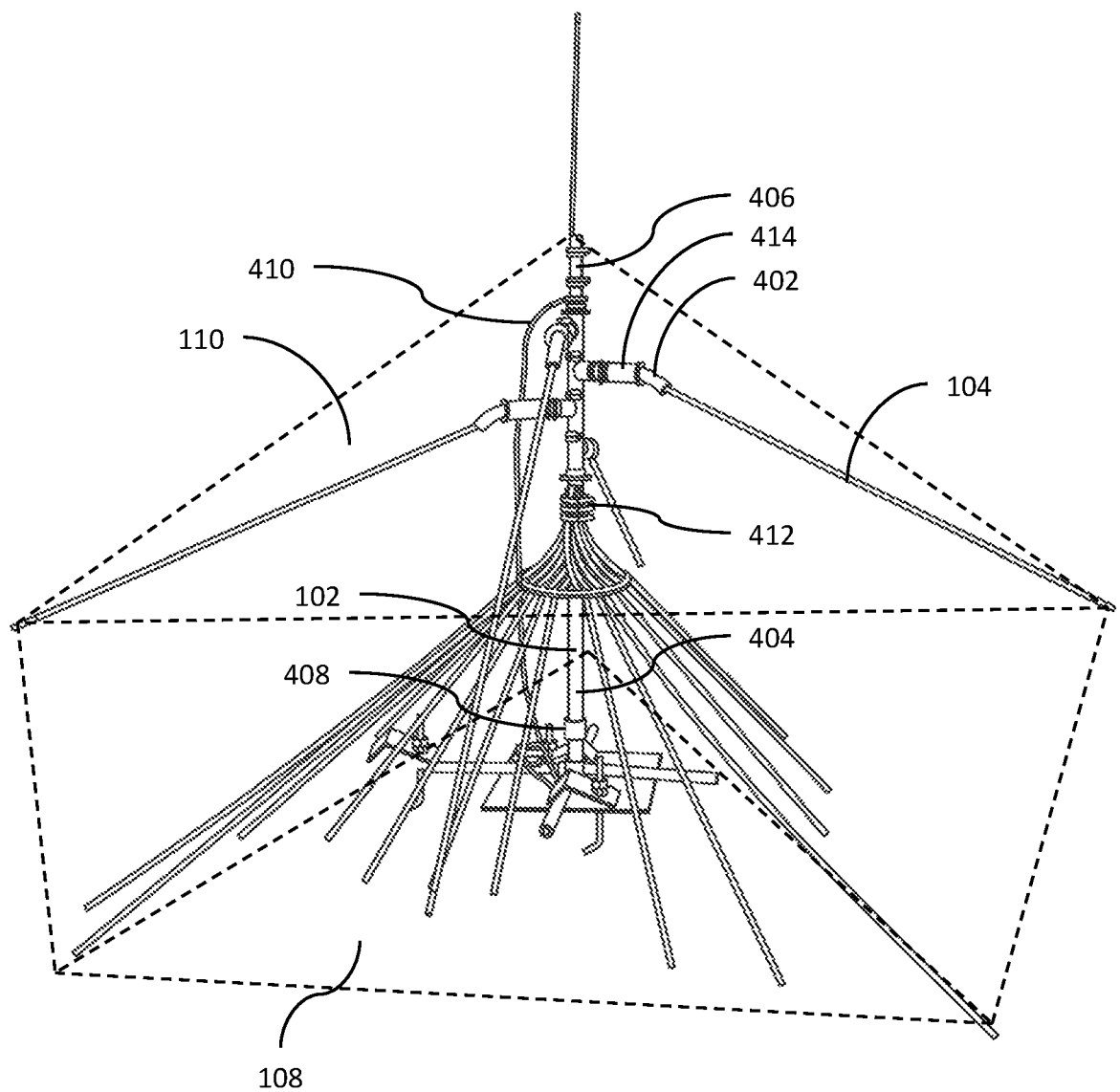

FIG. 4 shows an alternative embodiment in which the central support 102 may include receiving features specially adapted to receive and support the deterrence rods. In some embodiments, the receiving features may be protrusions or fittings 402 into which a deterrence rod may be inserted. In other embodiments, a receiving feature may be a region or surface 412 of the central support 102 to which a deterrence rod is either chemically bonded and/or mechanically attached. In the shown embodiment, the rods are bonded and clamped to the central support on a designated surface of the central support. In some embodiments, the central support takes on more complex configurations, including secondary branches 414 that extend from the central support, with the secondary branches 414 supporting the deterrence rods. In an embodiment, the secondary branches 414 may be slidably and/or rotatably coupled to the central support 102, and may be positioned on the central support 102 before or during installation in order to optimize rod orientation and position within the deterrence volume.

In the embodiment, the deterrence rods 104 are oriented at an angle with respect to gravity, which further prevents perching or nest-building within the deterrence area 108 or deterrence volume 110. In the preferred embodiment, the central support 102 will be a rigid member comprised of a proximal end 404 and a distal end 406. In the preferred embodiment, the proximal end 404 is affixed to a mounting point within the deterrence area 108. Affixation may be direct, such as by lagging or bolting the central support proximal end 404 directly to a structure within the deterrence area. Alternatively, the proximal end 404 of the central support 102 may be attached to an intermediate bracket 408 that is affixed to a structure within the deterrence area. In some embodiments, the proximal end of the central support may be removably mounted to the bracket 408 in order to expedite repositioning of the deterrence device in the event that entry into the deterrence volume 110 is necessary for maintenance, repair, inspection, or the like. In some embodiments, a secondary tether 410 prevents the device from falling in the event that the device is removed from the bracket 408 or in the event of bracket or other mechanical failure.

Figure 5:
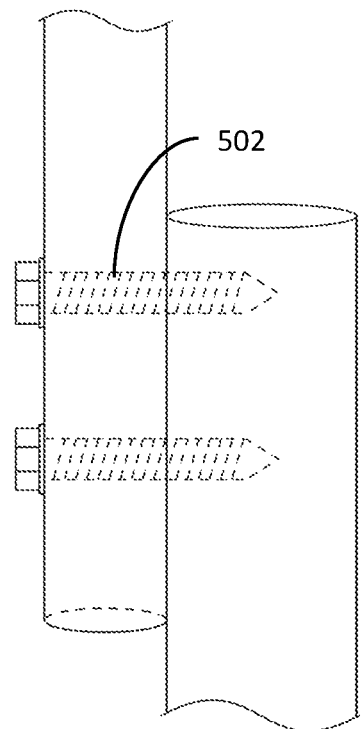
FIGS. 5-7 show various embodiments of device affixation to the deterrence area FIG. 8. is a view of the preferred embodiment in an intermediate deployment position.
Figure 6:
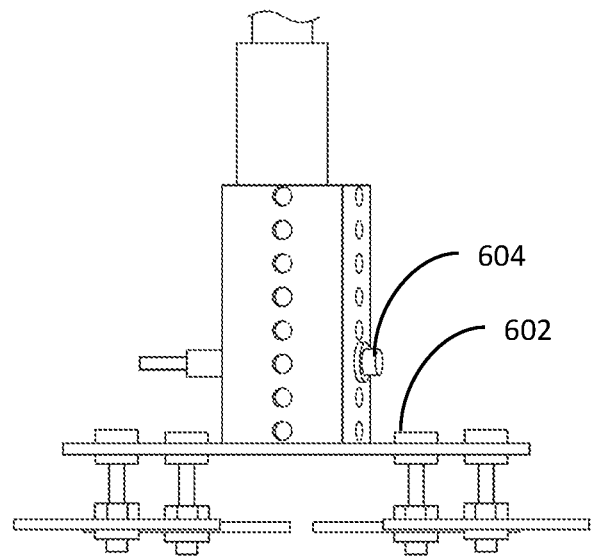
Figure 7:
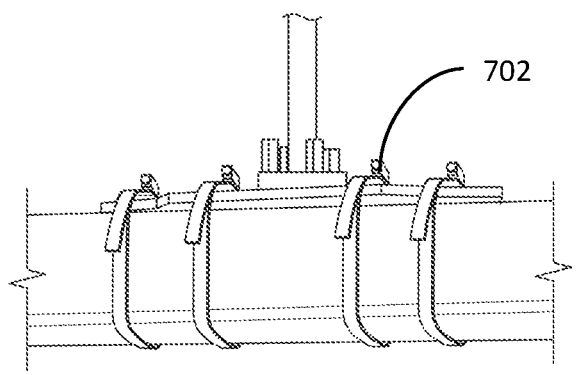

FIGS. 5-7 show various embodiments of mounting points. In some embodiments, the mounting point affixation may include lagging 502, bolting 602, clamping 702, bonding, pinning, welding, or other affixation technique.

In some embodiments, the device is slidably coupled within the intermediate bracket, and retained by a retainer 604. In such an embodiment, the central support 102 may be quickly unmounted by simple detachment of the retainer 604 to expedite access to the deterrence volume. In some embodiments, the deterrence volume 110 or deterrence area 108 take on very specific physical shapes or configurations, and the deterrence rod 104 position and orientation is critical to proper device function and protection of sensitive infrastructure equipment. The retainer 604 can be fixed or infinitely adjustable for proper device angular orientation.

Figure 8:
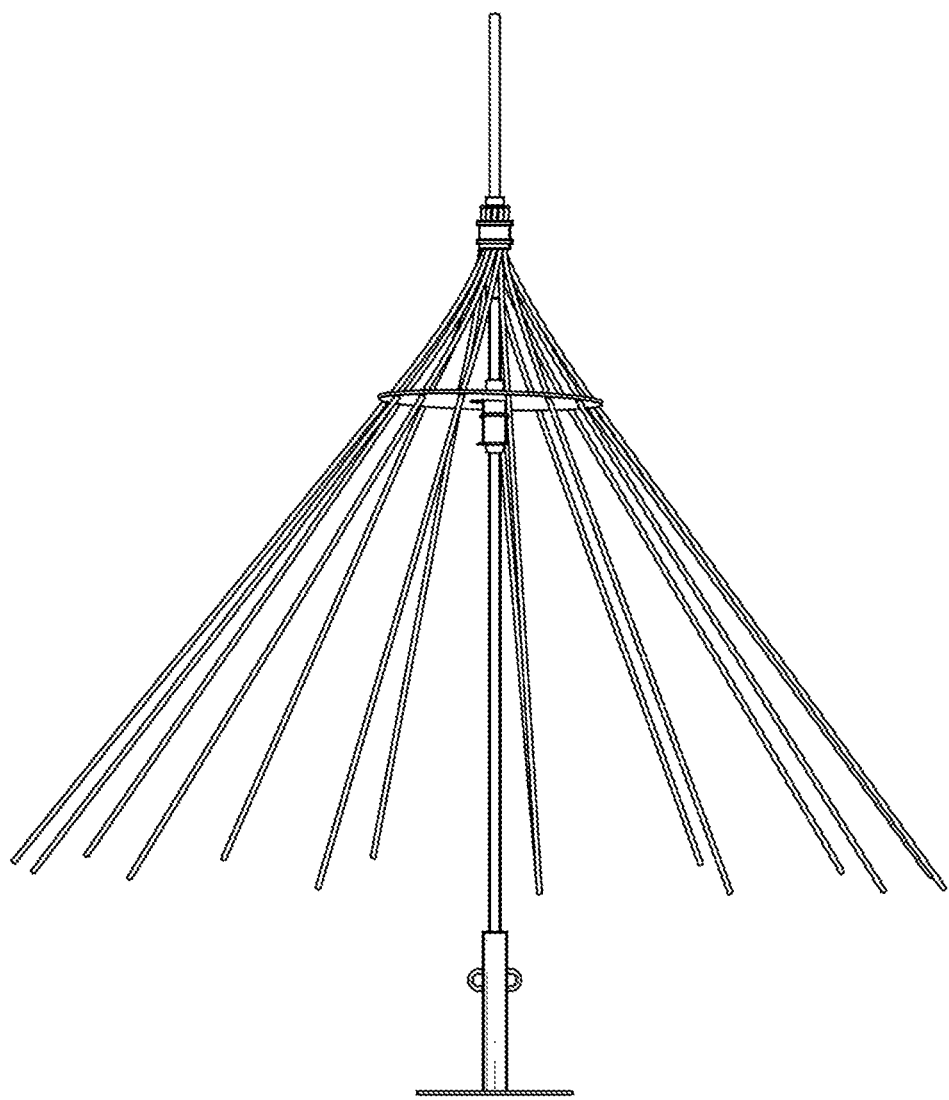

FIG. 8. is a view of the preferred embodiment in an intermediate deployment position, wherein the deterrence rod positioner at the deterrence rod proximal end is positioned at an intermediate position along the central support.

In the preferred method of use, a device user will mount the central support to an intermediary bracket that is mounted within the deterrence area. In the preferred method, the central support is removably mounted to the intermediary bracket. Removable mounting enables freer access to the deterrence area.

While preferred and alternate embodiments have been illustrated and described, as noted above, many changes can be made without departing from the spirit and scope of the nesting deterrence device. Accordingly, the scope of the nesting deterrence device is not limited by the disclosure of these preferred and alternate embodiments. Instead, the scope of the nesting deterrence device should be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶ 6. In particular, the use of "step of" in the claims herein is not intended to invoke the provisions of U.S.C. § 112 ¶ 6.

I claim:

1. A nesting deterrence device comprising:
    an elongate central support having a proximal end and a distal end, with said proximal end configured to be affixed to a mounting point within a deterrence area, said central support extending through a deterrence volume;
    a plurality of deterrence rods attached to said central support and extending through said deterrence volume, with said deterrence rods arranged and oriented such that at least one deterrence rod would interfere with avian transport of nest-building material toward the deterrence area,
    wherein the plurality of deterrence rods are attached to the central support proximal to one another at a generally regular angular spacing, the deterrence rods extend from the central support at an acute angle, the plurality of the deterrence rods take on a generally conical arrangement, and said deterrence rods and said central support are slidably coupled to a deterrence rod positioner.

2. The nesting deterrence device of claim 1, wherein a deterrence rod has a distal end and a proximal end, said proximal end is attached to the central support, and said distal end extends toward a peripheral surface of said deterrence volume.

3. The raptor nesting deterrence device of claim 2, wherein said deterrence rod positioner is repositionable to affect the width of the conical arrangement.

4. The raptor nesting deterrence device of claim 3, wherein the proximal ends of said deterrence rods are affixed to a proximal end deterrence rod positioner, and said proximal end deterrence rod positioner is slidably coupled to said central support.

5. The raptor nesting deterrence device of claim 3, wherein the deterrence rod material is fiberglass.

6. The nesting deterrence device of claim 1, wherein the central support has one or more secondary branches.

7. The nesting deterrence device of claim 6, wherein a deterrence rod has a distal end and a proximal end, said proximal end is attached to the central support, and said proximal end extends toward a peripheral surface of said deterrence volume.

8. The nesting deterrence device of claim 6, wherein a deterrence rod has a central portion and two distal ends, the deterrence rod is attached to the central support at the central portion, and the two distal ends each extend toward a peripheral surface of said deterrence volume.

9. A raptor nesting deterrence device comprising:
    A central support having a proximal end and a distal end, with said proximal end configured to be affixed to an upper portion of elevated infrastructure, and said distal end extending roughly vertically from said proximal end;
    a plurality of deterrence rods attached to said central support and extending radially from the central support, arranged and oriented such that at least one rod would interfere with an Osprey's ability to transport an item of nest-building material toward the upper portion of elevated infrastructure, wherein a portion of said plurality of deterrence rods are attached to the central support in a generally conical arrangement, and another portion of said plurality of deterrence rods are attached to the central supports at varying heights.

* * * * *